US010729069B2

(12) United States Patent
Condon

(10) Patent No.: US 10,729,069 B2
(45) Date of Patent: Aug. 4, 2020

(54) MULTIPLE OUTLET CHUTE LAWNMOWER HOUSING ASSEMBLY

(71) Applicant: Angie Condon, Waseca, MN (US)

(72) Inventor: Angie Condon, Waseca, MN (US)

( * ) Notice: Subject to any disclaimer, the term of this patent is extended or adjusted under 35 U.S.C. 154(b) by 198 days.

(21) Appl. No.: 15/908,093

(22) Filed: Feb. 28, 2018

(65) Prior Publication Data

US 2019/0261563 A1 Aug. 29, 2019

(51) Int. Cl.
| *A01D 43/063* | (2006.01) |
| *A01D 34/81* | (2006.01) |
| *A01D 34/00* | (2006.01) |
| *A01D 34/68* | (2006.01) |
| *A01D 34/125* | (2006.01) |
| *A01D 101/00* | (2006.01) |

(52) U.S. Cl.
CPC ....... *A01D 43/0631* (2013.01); *A01D 34/006* (2013.01); *A01D 34/68* (2013.01); *A01D 34/81* (2013.01); *A01D 34/125* (2013.01); *A01D 2101/00* (2013.01)

(58) Field of Classification Search
CPC .. A01D 43/0631; A01D 34/68; A01D 34/006; A01D 34/81; A01D 2101/00; A01D 34/125; A01D 34/71; A01D 34/67; A01D 42/005; A01D 34/828
See application file for complete search history.

(56) References Cited

U.S. PATENT DOCUMENTS

| 2,578,880 | A | * | 12/1951 | Doyle | ................ A01D 34/63 56/17.2 |
| 3,715,875 | A | * | 2/1973 | Brucker | ............. A01D 34/828 56/320.1 |
| 3,797,213 | A | * | 3/1974 | Sadow, Jr. | ......... A01D 34/828 56/320.1 |
| 3,818,687 | A | | 6/1974 | Houst et al. | |
| 4,107,907 | A | * | 8/1978 | Rutherford | ......... A01D 34/828 56/17.4 |
| 4,326,370 | A | | 4/1982 | Thorud | |
| 4,378,668 | A | * | 4/1983 | Gullett | .............. A01D 34/4168 56/12.7 |
| 5,040,364 | A | * | 8/1991 | Deegan | ............. A01D 43/0631 56/320.2 |
| 5,133,175 | A | * | 7/1992 | Dumbrell | ............ A01D 34/828 56/17.4 |
| 6,105,350 | A | | 8/2000 | Vachon et al. | |

(Continued)

FOREIGN PATENT DOCUMENTS

CN 1048717198 8/2017
WO WO2010140904 12/2010

*Primary Examiner* — Arpad Fabian-Kovacs

(57) ABSTRACT

A multiple outlet chute lawnmower housing assembly includes a housing with a top wall and a perimeter wall. The perimeter wall includes a front wall, a rear wall, a first side wall and a second side wall. The first side wall has a first discharge chute extending therethrough. The second side wall has a second discharge chute extending therethrough. A plurality of wheels is attached to the housing. A motor is attached to the housing and a cutting blade mechanically coupled to the motor is positioned beneath the top wall. A closure apparatus is attached to the housing and is actuated to selectively alter the first discharge chute or the second discharge chute from a closed condition to an open condition.

5 Claims, 5 Drawing Sheets

(56) References Cited

U.S. PATENT DOCUMENTS

| | | | |
|---|---|---|---|
| 6,609,358 B1 * | 8/2003 | Schmidt | A01D 42/005 56/320.2 |
| 6,672,043 B2 | 1/2004 | Shibata et al. | |
| 6,857,256 B2 * | 2/2005 | Strange | A01D 43/0635 56/17.4 |
| 6,874,309 B1 * | 4/2005 | Bellis, Jr. | A01D 42/005 56/320.2 |
| 6,971,224 B1 * | 12/2005 | Hancock | A01D 34/71 56/255 |
| 7,677,022 B2 * | 3/2010 | Chenevert | A01D 42/005 56/320.1 |
| 7,797,917 B1 * | 9/2010 | Pendleton | A01D 34/66 56/320.2 |
| 8,578,691 B2 * | 11/2013 | Lahey | A01D 34/71 56/202 |
| 9,277,689 B2 * | 3/2016 | Luking | A01D 34/71 |
| 2003/0182919 A1 * | 10/2003 | Baumann | A01D 34/71 56/320.1 |
| 2004/0128970 A1 | 7/2004 | Gazlay | |
| 2007/0261380 A1 | 11/2007 | Bledsoe | |
| 2008/0134654 A1 * | 6/2008 | Kohler | A01D 34/71 56/320.2 |
| 2011/0314783 A1 | 12/2011 | Dewey | |
| 2014/0318099 A1 * | 10/2014 | Thorman | A01D 42/005 56/320.2 |
| 2014/0331634 A1 * | 11/2014 | Korthals | A01D 34/005 56/320.2 |
| 2016/0212934 A1 | 7/2016 | Slegelis et al. | |
| 2019/0082592 A1 * | 3/2019 | Berglund | A01D 34/71 |

\* cited by examiner

MULTIPLE OUTLET CHUTE LAWNMOWER HOUSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to lawnmower housing devices and more particularly pertains to a new lawnmower housing device that allows a user to selectively eject grass clippings to either a right side or a left side of a lawnmower.

BRIEF SUMMARY OF THE INVENTION

An embodiment of the disclosure meets the needs presented above by generally comprising a housing including a top wall and a perimeter wall that is attached to and extends downwardly from the top wall. The perimeter wall includes a front wall, a rear wall, a first side wall and a second side wall. The first side wall has a first discharge chute extending therethrough. The second side wall has a second discharge chute extending therethrough. A plurality of wheels is attached to the housing and is configured to support the housing above a ground surface. A motor is attached to the housing. A cutting blade is attached to the housing beneath the top wall and is mechanically coupled to the motor. The cutting blade is rotated by the motor when the cutting blade is engaged with the motor and the motor is turned on. A closure apparatus is attached to the housing and is actuated to selectively alter the first discharge chute or the second discharge chute from a closed condition to an open condition. The closure apparatus includes a plurality of actuation positions. Each of the actuation positions is associated with one or more of the first or second discharge chutes being actuated from the closed condition to the open condition. A mulch position of the closure apparatus indicates each of the first and second chutes are in the closed condition.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
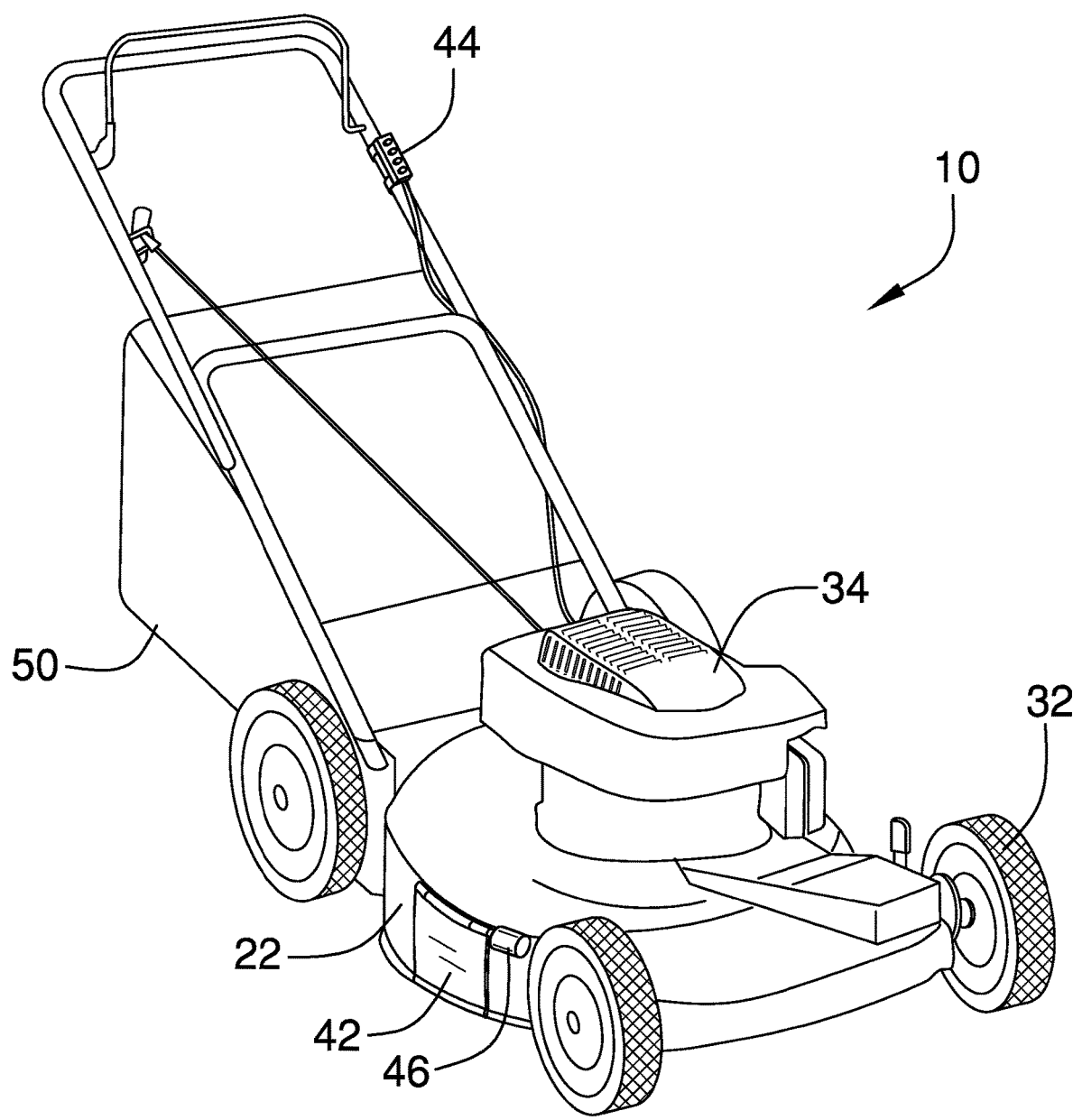
FIG. 1 is a left perspective view of a multiple outlet chute lawnmower housing assembly according to an embodiment of the disclosure.
Figure 2:
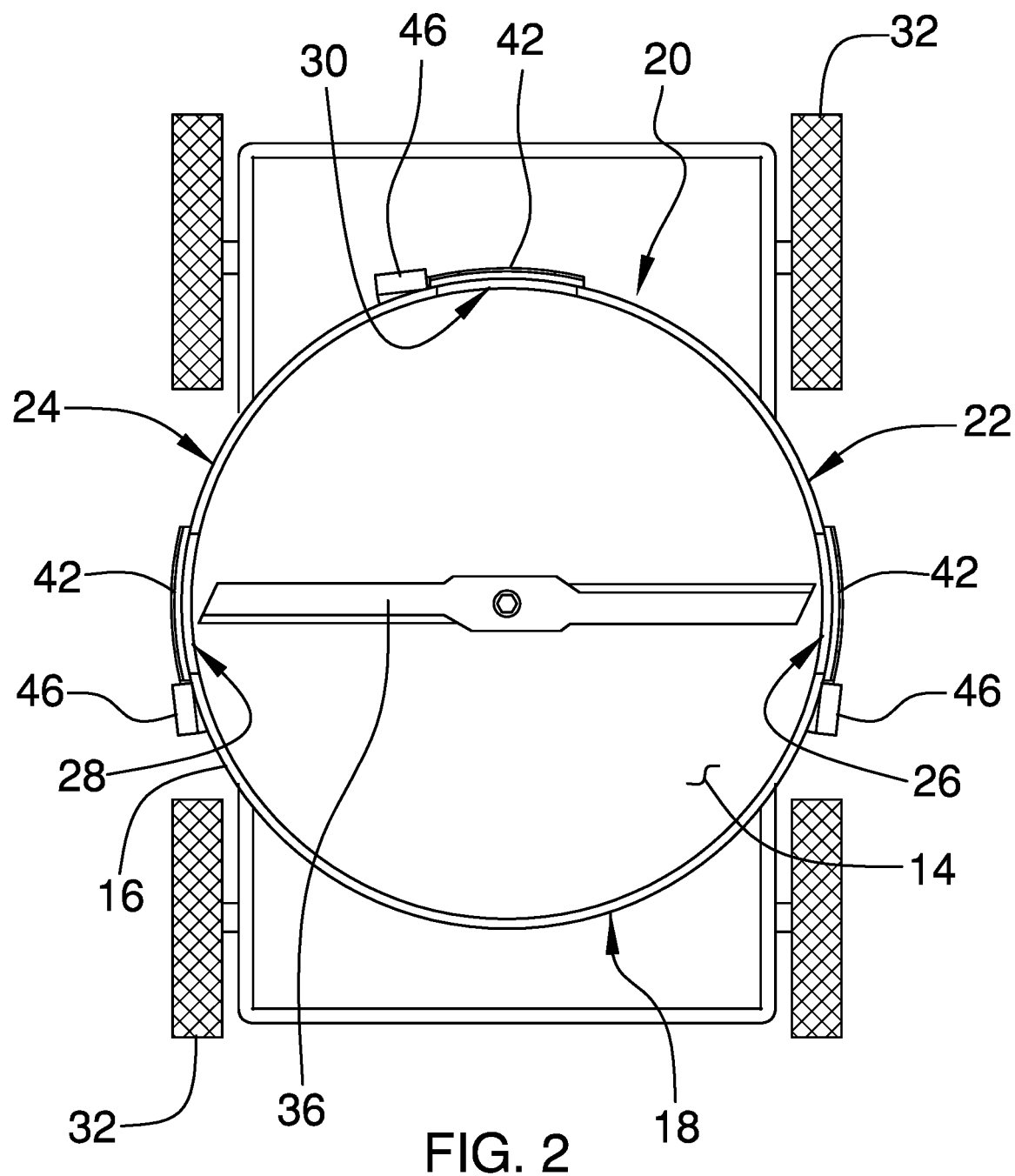
FIG. 2 is a bottom view of an embodiment of the disclosure.
Figure 3:
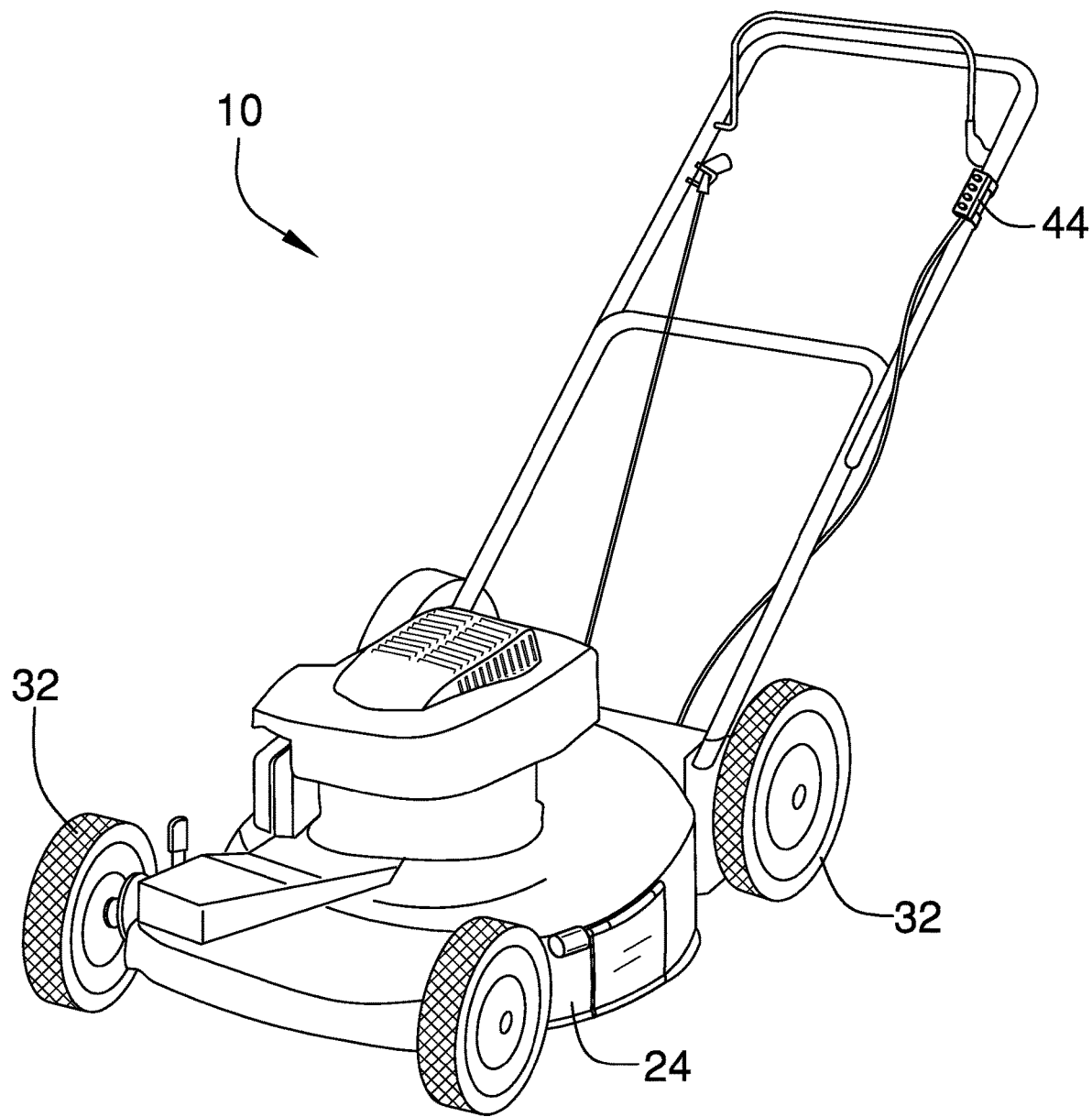
FIG. 3 is a right perspective view of an embodiment of the disclosure.
Figure 4:
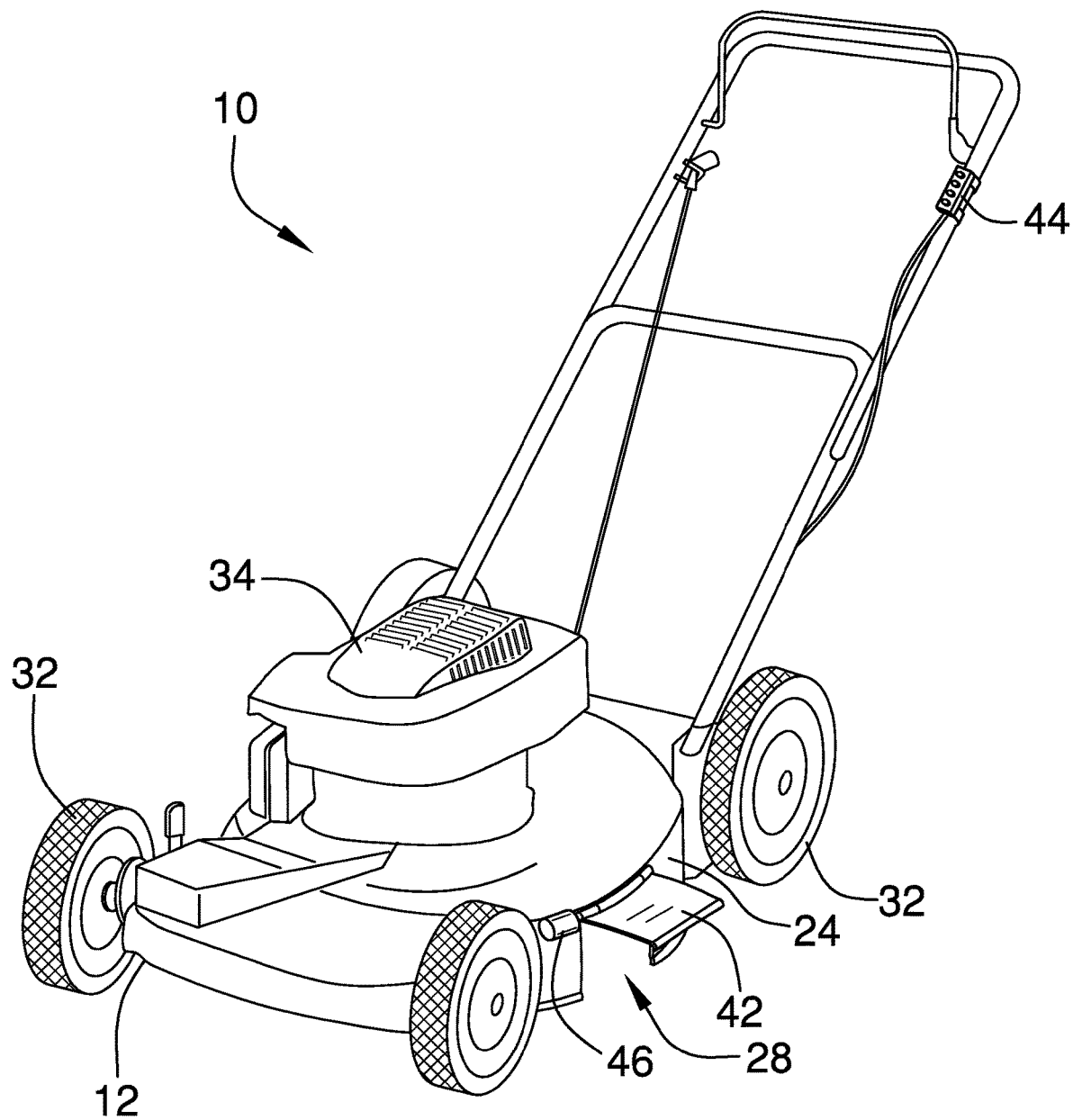
FIG. 4 is a right perspective view of an embodiment of the disclosure.
Figure 5:
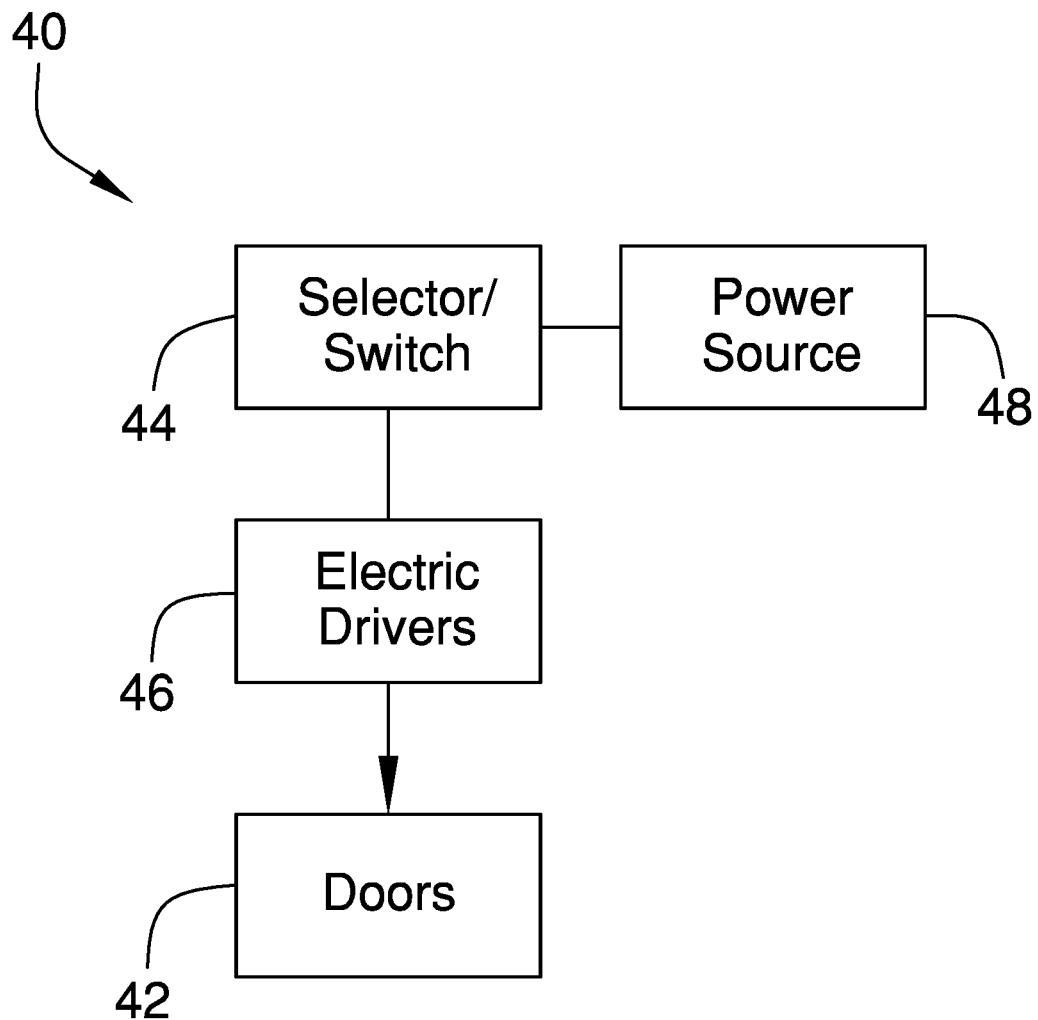
FIG. 5 is a schematic view of an embodiment of the disclosure.

With reference now to the drawings, and in particular to FIGS. 1 through 5 thereof, a new lawnmower housing device embodying the principles and concepts of an embodiment of the disclosure and generally designated by the reference numeral 10 will be described.

As best illustrated in FIGS. 1 through 5, the multiple outlet chute lawnmower housing assembly 10 generally comprises a housing 12, serving generally as a lawnmower deck, that includes a top wall 14 and a perimeter wall 16 that is attached to and extends downwardly from the top wall 14. The perimeter wall 16 includes a front wall 18, a rear wall 20, a first side wall 22 and a second side wall 24. The first side wall 22 has a first discharge chute 26 extending therethrough and the second side wall 22 has a second discharge chute 28 extending therethrough. A rear discharge chute 30 extends through the perimeter wall 16 rearwardly of the first 26 and second 28 discharge chutes.

A plurality of wheels 32 is attached to the housing 12 and is configured to support the housing 12 above a ground surface. The plurality of wheels 32 includes a first lateral pair of wheels positioned adjacent to the first side wall 22 and a second lateral pair of wheels that is positioned adjacent to the second side wall 24. A motor 34 is attached to the housing 12. A cutting blade 36 is attached to the housing 12 beneath the top wall 14 and is mechanically coupled to the motor 34 in a conventional manner. The cutting blade 36 is rotated by the motor 34 when the cutting blade 36 is engaged with the motor 34 and the motor 34 is turned on. The motor 34, wheels 32 and cutting blade 36 form a conventional lawnmower. Consequently, the motor 34 may be configured to engage or disengage with the cutting blade 36 and also may be engageable with the wheels 32 to propel the housing 12.

A closure apparatus 40 is attached to the housing. The closure apparatus 40 is actuated to selectively alter the first discharge chute 26, the second discharge chute 28 or the rear discharge chute 30 from a closed condition to an open condition. The closure apparatus 40 includes a plurality of actuation positions. Each of the actuation positions is associated with one or more of the first 26, second 28 or rear 30 discharge chutes being actuated from the closed condition to the open condition. A mulch position of the closure apparatus indicates that each of the first 26, second 28 and rear 30 discharge chutes are simultaneously in the closed condition. The plurality of actuation conditions further includes a first position opening the first discharge chute 26, a second position opening the second discharge chute 28 and a third position opening the rear discharge chute 30.

The closure apparatus 40 includes a plurality of doors 42 movably coupled to the housing 12. Each of the doors 42 corresponds to one of the first 26, second 28 and rear 30 discharge chutes and each of the doors 42 is positionable in a closed position or an open position. A selector 44 is mechanically coupled to each of the doors 42. The selector 44 is movable between the mulch, first, second, and third positions. It should be understood that the selector 44 may include a plurality of selectors wherein each of the doors 42 includes its own selector. The selector 44 may include one or more levers mechanically coupled to the doors 42 by way of cabling. Alternatively, a plurality of electric drivers 46 may be provided wherein each is operationally coupled to the selector 44. Each of the doors 42 would have one of the one of the electric drivers 46 coupled thereto and the electric drivers 46 each is actuatable by the selector 44 to move an associated one of the doors 42 to the closed position or the open position. The electric drivers 46 may be electric motors conventionally coupled to the doors 42. For example, the electric motors may be used to rotate a spindle to pivot an attached door between open and closed positions. The electric motors may be used to rotate a screw drive that is coupled to the doors 42 to slide the doors between open and closed positions. Alternatively, the electric drivers 46 may comprise solenoids used to move a door from a closed position to an open position.

The selector 44 may include an electronic switch operationally coupled to each of the electric drivers 42. The selector may therefore include one or more buttons that correspond with the first, second, third and mulch positions. If the selector is an electronic switch and electric drivers 46 are utilized, the assembly 10 will further include a power source 48 electrically coupled to the selector 44 and to the electric drivers 42. The power source 48 may include a rechargeable battery that is plugged into a power supply, such an outlet. Alternatively, the power source 48 may include a rechargeable battery coupled to an alternator driven by the motor 34 or the alternator may provide electric power without an intervening battery.

In use, the assembly 10 is used as a conventional lawnmower. The structure described herein, it should be understood, may be used with a riding lawnmower or a push lawnmower. The multiple chutes allow a user of the assembly 10 to select if grass clippings will be ejected from the housing 12 to the left or the right. Additionally, should the grass clippings be retained, such as in a collection bag 50, the rear discharge chute 30 may be opened and a collection bag 50 is attached to the housing 12 that is in communication with the rear discharge chute 30. However, a collection bag 50 could be attached to the first 26 or second 28 discharge chutes should the rear discharge chute 30 not be provided. If each of the first 26, second 28 and rear 30 discharge chutes are retained in a closed position, the glass clippings will be mulched within the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A lawn mower assembly comprising:
a housing including a top wall and a perimeter wall being attached to and extending downwardly from said top wall, said perimeter wall including a front wall, a rear wall, a first side wall and a second side wall, said first side wall having a first discharge chute extending therethrough, said second side wall having a second discharge chute extending therethrough;
a plurality of wheels being attached to said housing and being configured to support said housing above a ground surface;
a handle coupled to and extending rearwardly and upwardly from said housing wherein said housing is configured to be pushed by a user grasping said handle;
a motor being attached to said housing;
a cutting blade being attached to said housing beneath said top wall and being mechanically coupled to said motor, said cutting blade being rotated by said motor when said cutting blade is engaged with said motor and said motor is turned on; and
a closure apparatus being attached to said housing, said closure apparatus being actuated to selectively alter said first discharge chute or said second discharge chute from a closed condition to an open condition, said closure apparatus including a plurality of actuation positions, each of said actuation positions being associated with one or more of said first or second discharge chutes being actuated from said closed condition to said open condition, a mulch position of said closure apparatus indicating each of said first and second chutes are in said closed condition, said closure apparatus including
a plurality of doors being movably coupled to said housing, each of said doors corresponding to one of said first and second discharge chutes, each of said doors being positionable in a closed position or an open position, a selector being mechanically coupled to each of said doors, said selector being movable between said first, second and mulch positions, and a plurality of electric drivers each being operationally coupled to said selector, each of said doors having one of said electric drivers coupled thereto, said electric drivers each being actuatable by said selector to move an associated one of said door to said closed position or said open position.

2. The lawn mower assembly according to claim 1, said plurality of actuation conditions including:

a first position opening said first discharge chute; and a second position opening said second discharge chute.

3. A lawn mower assembly comprising:

a housing including a top wall and a perimeter wall being attached to and extending downwardly from said top wall, said perimeter wall including a front wall, a rear wall, a first side wall and a second side wall, said first side wall having a first discharge chute extending therethrough, said second side wall having a second discharge chute extending therethrough, a rear discharge chute extending through said perimeter wall rearwardly of said first and second discharge chutes;

a plurality of wheels being attached to said housing and being configured to support said housing above a ground surface;

a handle coupled to and extending rearwardly and upwardly from said housing wherein said housing is configured to be pushed by a user grasping said handle;

a motor being attached to said housing;

a cutting blade being attached to said housing beneath said top wall and being mechanically coupled to said motor, said cutting blade being rotated by said motor when said cutting blade is engaged with said motor and said motor is turned on;

a closure apparatus being attached to said housing, said closure apparatus being actuated to selectively alter said first discharge chute, said second discharge chute or said rear discharge chute from a closed condition to an open condition, said closure apparatus including a plurality of actuation positions, each of said actuation positions being associated with one or more of said first, second or rear discharge chutes being actuated from said closed condition to said open condition, a mulch position of said closure apparatus indicating each of said first, second and rear discharge chutes are in said closed condition, said closure apparatus including a plurality of doors being movably coupled to said housing, each of said doors corresponding to one of said first, second and rear discharge chutes, each of said doors being positionable in a closed position or an open position, a selector being mechanically coupled to each of said doors, said selector being movable between said first, second, third, and mulch positions, and a plurality of electric drivers each being operationally coupled to said selector, each of said doors having one of said electric drivers coupled thereto, said electric drivers each being actuatable by said selector to move an associated one of said door to said closed position or said open position.

4. The lawn mower assembly according to claim 3, wherein said plurality of actuation conditions includes:

a first position opening said first discharge chute;

a second position opening said second discharge chute; and a third position opening said rear discharge chute.

5. A lawn mower assembly comprising:

a housing including a top wall and a perimeter wall being attached to and extending downwardly from said top wall, said perimeter wall including a front wall, a rear wall, a first side wall and a second side wall, said first side wall having a first discharge chute extending therethrough, said second side wall having a second discharge chute extending therethrough, a rear discharge chute extending through said perimeter wall rearwardly of said first and second discharge chutes;

a plurality of wheels being attached to said housing and being configured to support said housing above a ground surface, said plurality of wheels including a first lateral pair of wheels being positioned adjacent to said first side wall and a second lateral pair of wheels being positioned adjacent to said second side wall;

a handle coupled to and extending rearwardly and upwardly from said housing wherein said housing is configured to be pushed by a user grasping said handle;

a motor being attached to said housing;

a cutting blade being attached to said housing beneath said top wall and being mechanically coupled to said motor, said cutting blade being rotated by said motor when said cutting blade is engaged with said motor and said motor is turned on;

a closure apparatus being attached to said housing, said closure apparatus being actuated to selectively alter said first discharge chute, said second discharge chute or said rear discharge chute from a closed condition to an open condition, said closure apparatus including a plurality of actuation positions, each of said actuation positions being associated with one or more of said first, second or rear discharge chutes being actuated from said closed condition to said open condition, a mulch position of said closure apparatus indicating each of said first, second and rear discharge chutes are in said closed condition, said plurality of actuation conditions including:

a first position opening said first discharge chute;

a second position opening said second discharge chute; and a third position opening said rear discharge chute;

said closure apparatus including:

a plurality of doors being movably coupled to said housing, each of said doors corresponding to one of said first, second and rear discharge chutes, each of said doors being positionable in a closed position or an open position;

a selector being mechanically coupled to each of said doors, said selector being movable between said first, second, third, and mulch positions;

a plurality of electric drivers each being operationally coupled to said selector, each of said doors having one of said electric drivers coupled thereto, said electric drivers each being actuatable by said selector to move an associated one of said door to said closed position or said open position.

* * * * *